Figure 1:
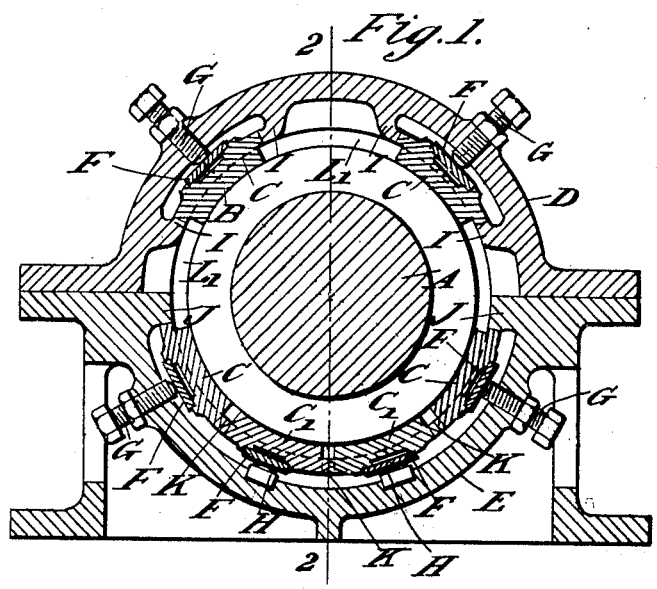

H. T. NEWBIGIN.
JOURNAL BEARING.
APPLICATION FILED MAY 4, 1918.

1,322,332.

Patented Nov. 18, 1919.

Witnesses:

Inventor
Henry T. Newbigin

UNITED STATES PATENT OFFICE.

HENRY T. NEWBIGIN, OF NEWCASTLE-UPON-TYNE, ENGLAND.

JOURNAL-BEARING.

1,322,332.   Specification of Letters Patent.   Patented Nov. 18, 1919.

Application filed May 4, 1918. Serial No. 232,612.

*To all whom it may concern:*

Be it known that I, HENRY THORNTON NEWBIGIN, a subject of the King of Great Britain, residing in Newcastle-on-Tyne, England, have invented certain new and useful Improvements in Journal-Bearings, of which the following is a specification.

The practical success of the pivoted form of thrust bearing described in British specification No. 875 of 1905, whereby the axial thrust of a shaft is carried by a plurality of pivoted blocks acting against a single plane surface and automatically generating high pressure oil films, which prevent metallic contact between the surfaces, has naturally directed attention to the possibility of obtaining similarly satisfactory results in journal bearings.

It has long been known that under favorable conditions, a journal bearing will automatically generate a pressure oil film at one part of its circumference. The width of this oil film depends on the difference between the diameter of the journal and its bearing, the viscosity of the lubricant and the intensity of the pressure, and in practice it is usually only a small fraction of the diameter of the shaft. Consequently, the effective supporting part of the oil film is merely a narrow strip and the remaining surface is not only non-effective for load carrying purposes, but acts as a brake on the rotation of the shaft, whereas in the pivoted form of thrust bearing, the whole surface of the bearing is effective for carrying the load and there is no "brake surface."

For journal bearings, it is advantageous to obtain a plurality of pressure oil films acting radially toward the axis of the shaft, but capable of carrying a high pressure over the whole of their projected surfaces. I have found by experimental tests that two conditions must be provided in order to obtain satisfactory results.

The first condition is, that where there are more than two blocks in the half bearing, means must be provided to secure an equal distribution of the load among them.

The second condition is, that where the arc of contact of the block with the shaft is small (as it usually is owing to the necessity of limiting the length of the block), it is necessary to guide the blocks, so as to prevent any tendency for them to oscillate about axes at right angles to the axis of the shaft, that is, about radii from the center of the shaft passing through any point on the bearing surface of the blocks.

If any movement of the blocks occurs about these axes, the contact between the journal and the blocks is limited to two diagonally opposite corners (while the other two corners lift and allow the oil film to escape); the consequent increase of friction at these points of contact causes the blocks to rotate so as bring the other corners into contact with the shaft with resultant wear of the blocks and impaired efficiency.

In my British specification No. 13,599 of 1916 means are described for obtaining an equal distribution of the load among the blocks and the present invention relates to an improved construction by which the required equal distribution is obtained and which provides for the dampening of the vibrations set up in high speed bearings, such as are used in steam turbines. The construction also fulfils the second requirement referred to above, by providing means for guiding the blocks, so that their axes are always parallel to that of the shaft and any tendency of the blocks to rotate about radial lines is prevented.

According to the invention, at the back of each block is a plate of resilient material, such as tempered spring steel, the edges of the plates being fitted to the blocks, but the central portions free.

Round pins or adjustable set screws passing through the housings of the bearings in contact with the plates support the blocks. The plates are, preferably, flat and circular, but one surface may be convex, or they may be saucer shaped, or of other form. In some cases instead of rounded pins or set screws, the plates may be fitted in pairs of which, preferably, one plate is flat and the other rounded, the rounded surface of one plate bearing against the flat surface of the other, one plate being let into the block and the other into the housing.

The resilience of such spring plates is sufficient to give an equal, or approximately equal, distribution of the load among the individual blocks. They also serve to damp the vibrations of high speed journal bearings.

In order to maintain the axes of the individual blocks parallel with the axis of the shaft, the blocks are held between guides which prevent rotation about their radial lines. In operation, the blocks lift in known manner at their leading edge to admit the oil.

The guides are usually made in one with the housing, as owing to the shortness of such bearings, a swiveling adjustment is not usually necessary, but they may be provided in a ring which is spherical on its outer surface and mounted in a spherical cavity in the housing so as to obtain a swiveling action in the bearing as a whole.

Figure 2:
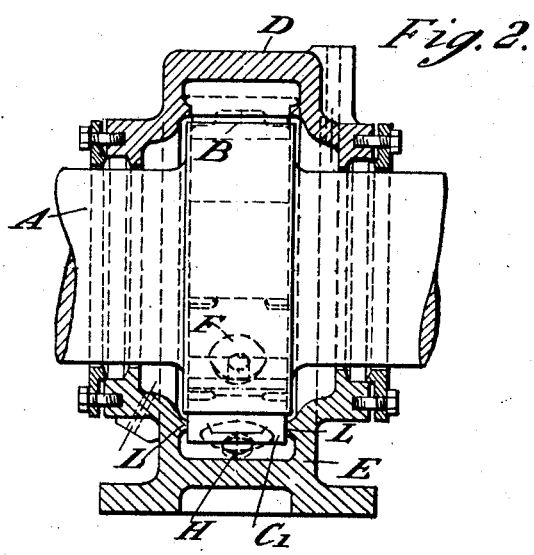

The accompanying drawings represent an example of a construction according to the invention, in which Figure 1 is a transverse vertical section of a journal bearing provided with a plurality of blocks and Fig. 2 is a side elevation partly in section on the line 2—2 of Fig. 1.

The journal B of the shaft A rotates in contact with the inner surfaces of blocks C and $C_1$. D is the upper and E the lower carrying member. A resilient circular plate or disk F of tempered spring steel is let into the back of each block C or $C_1$, so as to be held by its circumference, but to be free at the center. In the construction shown, the plates F let into the blocks C are supported by screws G with rounded ends threaded into the housings; the plates F let into the blocks $C_1$ are supported by short pins H let into the lower housing and provided with rounded surfaces where they bear on the plates F.

The blocks C of the upper bearing are prevented from rotating about the radial lines by being held or guided between the parallel surfaces $L_1$ of the upper housing and from rotating with the shaft by the projections I. The lower blocks are similarly guided by the parallel surfaces L and the blocks are prevented from rotating with the shaft by contact with the ends J of the recess and the mutual contacts at K between the enlarged back surfaces of adjacent blocks.

Having thus fully described the nature of my invention and the best means I know for carrying the same into practical effect, I claim:—

1. A journal bearing comprising an upper and a lower carrying member, a plurality of segmental blocks having their inner surfaces adapted to contact with a shaft, plates of resilient material each mounted on the outer surface of one of said blocks intermediate its ends, and means associated with said upper and lower members for supporting said plates.

2. A journal bearing comprising an upper and a lower carrying member, a plurality of segmental blocks having their inner surfaces adapted to contact with a shaft, plates of tempered steel each mounted on the outer surface of one of said blocks intermediate its ends, and means associated with said upper and lower carrying members engaging said plates.

3. A journal bearing comprising an upper and a lower carrying member, a plurality of segmental blocks having their inner surfaces adapted to contact with a shaft, plates of resilient material each secured only at its edges to the back of one of said blocks, and means associated with said carrying members for supporting each plate at its center.

4. A journal bearing comprising an upper and a lower carrying member, a plurality of segmental blocks having their inner surfaces adapted to contact with a shaft, plates of resilient material each attached only at its edges to the back of one of said blocks, and adjustable set screws carried by said carrying members and each pivotally supporting one of said plates.

5. A journal bearing comprising an upper and a lower carrying member, a plurality of segmental blocks having their inner surfaces adapted to contact with a shaft, plates of resilient material each mounted on the back of one of said blocks intermediate its ends and supported by one of said carrying members, and guides in said carrying members coöperative with said segments to prevent rotation of said segments about an axis passing through the center of the shaft and the center of the segments.

In testimony whereof I have signed my name to this specification in the presence of two subscribing witnesses.

HENRY T. NEWBIGIN.

Witnesses:
 PERCY CORDER,
 GEORGE GIBBIN.